Patented Oct. 23, 1951

2,572,458

UNITED STATES PATENT OFFICE 2,572,458

PRESSURE-SENSITIVE ADHESIVE TAPE

Warner Eustis, Newton, Mass., assignor to The Kendall Company, Boston, Mass., a corporation of Massachusetts No Drawing. Application May 18, 1944,
Serial No. 536,198

5 Claims. (Cl. 117—122)

This invention relates to pressure-sensitive adhesive tapes and is concerned particularly with the formulation of the adhesives thereof. Adhesives formulated in accordance with this invention, especially when combined with suitable and preferred types of backings as hereinafter described, provide pressure-sensitive adhesive tapes having highly improved electrical properties, including low power factor and high dielectric strength, while combining with these special qualities commercially satisfactory characteristics of adhesive pressure-sensitivity, adhesion, and ageing (in some cases by the utilization of prepared containers), so that the tape may be preserved over substantial periods of time with its adhesive remaining in a soft, viscous, tacky, pressure-sensitive condition, whereby the tape may be manipulated and applied to an external surface in the ordinary manner of masking or of surgeon's tape.

In order to impart satisfactory pressure-sensitive characteristics to an adhesive and, particularly, good adhesion characteristics, rosins and/or resins with or without non-volatile liquid plasticizers are widely used as necessary modifiers for the film-forming or elastomeric ingredient of the adhesive, which ingredient, being chosen for its elastic and tensile strength qualities, usually has insufficient adhesion without modification. The dielectric properties of these rosins, resins and plasticizers are in general so inferior and affect the insulating qualities of adhesives containing them so adversely that present-day pressure-sensitive tapes do not find as great a use in the electrical industry as their convenience would appear at first glance to warrant.

It is an object of this invention to provide adhesives, having commercially satisfactory and preferably stable qualities of tack and adhesion, which help to give a tape useful electrical properties such as high breakdown voltage and low power factor.

Adhesives of this invention are structurally novel because, as distinguished from compounded adhesives having high molecular weight elastomers, for instance natural rubber, which are modified in the direction of increased adhesion and/or reduced viscosity by the inclusion of compatible but molecularly foreign modifiers (i. e. rosin, resin, and non-volatile liquid plasticizers), they consist, in the preferred form, solely of polymolecular polymeric systems—or such systems containing additional solids which are inert, i. e. fillers—wherein the molecular weight distribution of the polymers in the system (being preferably all polymers of the same monomeric unit) is a predeterminedly controlled perturbation of a normal polymolecular distribution, presenting an abnormal or unnatural distribution of molecular weights. By such deliberate perturbation, elasto-viscous polymeric materials are obtained which per se, or in the presence of the inert filler, possess the required viscous, tacky, and preferably stable pressure-sensitive adhesive characteristics, and which are spreadable into coherent sheets as by a solvent spreading or calendering operation, in forms useful as pressure-sensitive adhesive coats on suitable backings to form pressure-sensitive adhesive tapes.

High molecular weight polymeric substances, both natural, such as polyisoprene, and synthetic, such as high molecular weight polybutadiene, polybutene, and polystyrene, and copolymers thereof are known to consist of molecules of widely different size. The molecular weights of the different molecules are distributed about some average value, and in the normal aggregation, there are molecules much smaller as well as much larger than this average value.

The normal distribution of molecular weight species produced in a normal linear polymerization reaction is known. According to Flory (Journal American Chem. Society, 58, 1877 (1936)), as the reaction approaches completion the number of polymers in any single molecular species decreases but the percentage by weight of the species having a molecular weight greater than the molecular weight having the greatest number of polymers increases and many species have a molecular weight well above the average.

These normal distributions are found in the case of high polymeric substances such as natural rubber, polybutene (Vistanex), polystyrene and copolymers of butene and isoprene (butyl rubber), and of butadiene and styrene (Buna S).

According to the extent of reaction allowed, the properties of these polymeric substances, such as toughness, tensile strength, viscosity, and others, can be altered within limits, such properties varying continuously with the change in normal distribution which is a mathematical function of the extent of reaction. However the variation does not approach the amount of variation in properties that can be secured by the utilization of this invention, which is founded upon the discovery that elasto-viscous materials comprising polymolecular systems of hydrocarbon polymers can be formed with stable or stabilized molecular weight distributions so much at variance with the normal molecular weight distribution of unperturbed polymeric systems as to yield distinctive products which, in and of themselves—or merely with the inclusion of inert fillers—are practicably useful as pressure-sensitive adhesives, in contradistinction to the normal distribution systems, such as rubber, polybutene or Buna S, which require modification with one or more molecularly foreign modifiers before they are thus practicably useful. In practice, the variation is usually such that the system is characterized by a materially increased concentration of polymers of molecular weight ranging about a relatively low molecular weight, over the normal concentration of such polymers in a normal polymeric distribution.

A main resulting advantage is that the adhesive has substantially the electrical properties of the monomerically related or homogeneous hydrocarbon elasto-viscous material, unimpaired by the presence of tack-increasing rosin, resin or other modifiers which, by reason of ester or other oxygen-type linkages, or for other reasons, are dielectrically undesirable. Inert fillers, on the other hand, of good electrical characteristics are readily available and can therefore be included without adverse effect upon the electrical properties of the adhesive as a whole.

The distinction between normal molecular weight distributions and abnormal, unnatural or perturbed molecular weight distributions of the type contemplated by this invention, can be conveniently described by reference to mathematical expressions showing the normal distribution function or functions in contrast to such abnormal, unnatural or perturbed distribution function or functions.

The normal polymeric distribution in polymeric substances of the type useful in the formation of adhesives of this invention is of the type determined by Flory for linear polymers (J. A. C. S. 58, 1877 (1936)) according to the equation $$\pi_x = x p^{x-1} (1-p)^2$$

where $\pi_x$ = the proportion by weight of polymers of chain length "$x$"
$x$ = the chain length; and
$p$ = the extent of polymerization reaction For present purposes, this equation can be generalized in the expression $$\pi_x = g(x, p)$$

representing normal molecular weight distribution in a polymeric substance formed by any natural or synthetic polymerization process, as a function ($g$) of chain length ($x$) and extent of reaction ($p$).

With this generalization, the molecular weight distributions of adhesives of this invention are identified by the mathematical expressions:

$$\pi_x = g_1(x, p_1) f(x) \tag{I}$$

$$\pi_x = g_1(x, p_1) \frac{W_1}{W_1 + W_2 + \ldots + W_n} +$$
$$g_2(x, p_2) \frac{W_2}{W_1 + W_2 + \ldots + W_n} +$$
$$\ldots + g_n(x, p_n) \frac{W_n}{W_1 + W_2 + \ldots + W_n} \tag{II}$$

$$\pi_x = g_1(x, p_1) f_1(x) \frac{W_1}{W_1 + W_2 + \ldots + W_n} +$$
$$g_2(x, p_2) f_2(x) \frac{W_2}{W_1 + W_2 + \ldots + W_n} +$$
$$\ldots + g_n(x, p_n) f_n(x) \frac{W_n}{W_1 + W_2 + \ldots + W_n} \tag{III}$$

wherein $\pi_x$ = the proportion by weight of polymers of chain length "$x$";
$x$ = the chain length;
$p_1, p_2 \ldots p_n$ are the extents of reaction in polymeric substances $1, 2, \ldots n$;
$W_1, W_2, \ldots W_n$ are the weights of polymeric substances in different ranges ($1, 2 \ldots n$) of molecular weights; and $$g_1(x, p_1), g_2(x, p_2) \ldots g_n(x, p_n)$$

are the individual distribution functions of normal molecular weight distribution systems $1, 2 \ldots n$; and $f(x)$ in (I) is less than 1 for at least one value of $x$; and
$f_1(x), f_2(x) \ldots f_n(x)$ are equal to 1 or less and one of which is less than 1 for at least one value of "$x$."

An abnormal or unnatural distribution conforming to expression (I) is illustrated by a normal distribution system which has been perturbed as by a fractionation technique to remove or disproportionately reduce certain selected components or groups of components of particular molecular weight or weights.

An abnormal or unnatural distribution conforming to expression (II) is illustrated by a polymeric system composed of a combination of two or more normal distribution systems, such as a low molecular weight system or a monomeric system with a higher molecular weight system or systems.

An abnormal or unnatural distribution conforming to expression (III) is illustrated by a polymeric system composed of a combination of one or more abnormal distribution systems with one or more abnormal or normal distribution systems.

The perturbation from normal distribution of elasto-viscous materials of this invention is, in most cases, so marked that, graphically, the number of polymer molecules plotted against particular molecular weight will produce a curve having two or more definite maxima indicating concentration of polymers around at least two different particular molecular weights, usually widely separated; or by a curve characterized by a flattened segment or pronounced platyallokurtosis; in contradistinction to normal distribution curves indicating a definite maximum concentration of polymers around a single molecular weight.

The elasto-viscous materials contemplated by this invention comprise predeterminedly controlled perturbed stable or stabilized polymeric systems, as above described, consisting of ethylenic polymerization or copolymerization products of olefins, such as ethylene and butene, diolefins, such as butadiene and isoprene, and monoderivatives of olefins and diolefins, such as styrene and chloroprene, the normal distribution systems whereof are not, as above indicated, per se useful as commercially satisfactory pressure-sensitive adhesives.

Transparent adhesives formed of such olefinic polymers may be prepared in a variety of ways from a variety of unsaturated hydrocarbons. Examples follow.

EXAMPLE A

Polybutene, an olefin polymer having a normal distribution of molecular weights and prepared for instance according to the method given in Frolich United States Patent No. 2,109,772, is separated by precipitation into fractions, each of a limited molecular weight distribution. This may be conveniently done by dissolving 29 grams of commercial polybutene (Vistanex B-80) in 2050 cc. of benzene; 100 cc. of dry acetone are added with stirring at slightly above room temperature and the container is then placed in a water bath at 25° C. After several hours equilibration, the precipitate which appears is separated by decantation. If desired, reprecipitation may be carried out and the precipitate is then steeped in methanol and vacuum dried. The fraction thus obtained contains chains of molecular weight of 500,000 or greater, based on Flory's osmotic measurements, (J. A. C. S. 65, 372-82 [1943]).

Successive fractionations from solutions containing successively larger ratios of acetone to benzene secure lower molecular weight fractions.

*Example A adhesive*

A transparent adhesive mass is prepared from chosen polybutene fractions by mixing in the following proportions on a rubber-type mill:

| | Per cent |
|---|---|
| Polybutene (molecular weight above 500,000) | 50 |
| Polybutene (molecular weight up to 20,000) | 50 |

After thorough mixing, the mass may be sheeted onto a suitable backing, such as, for general adhesive purposes, woven or unwoven cloth, paper, cellophane or other transparent films, as by calendering; or it may be solvent spread in a gasoline-type solvent.

Where electrical uses are contemplated, especially those involving high or ultra-high frequencies, more desirable results are produced when the adhesive is spread on a backing chosen for its low power factor and high breakdown voltage, such as a polystyrene film, transparent or opaque, or woven or otherwise fabricated glass sheet material.

In some instances, the low molecular weight fractions desired may be secured by incomplete polymerization processes, rather than fractionation of more highly polymerized complexes. For instance, a satisfactory adhesive is prepared as follows:

| | Per cent |
|---|---|
| Vistanex B-80 | 53 |
| Vistac A (low molecular weight polybutene) | 47 |

In the case of any of these polybutene adhesives, an inert filler of desirable dielectric properties, such as powdered polystyrene, ground mica, ground quartz, ground glass, or combinations thereof may be included without any substantial loss of desirable electric insulating properties. Or, where desired, inert opacifying fillers may be added.

EXAMPLE B

GR-S (Institute West Virginia tire stock), an unsaturated hydrocarbon high molecular weight polymer (butadiene-styrene copolymer) of natural polymolecular distribution may be fractionated in a similar manner. Thirty grams of this stock are dissolved in benzene and 575 cc. of methyl alcohol are added to 2400 cc. of the solution at slightly above room temperature and the container is then placed in a water bath at 25° C. The precipitate secured after several hours' equilibration, separation by decantation, and vacuum drying is a rubber-like elastomer of high molecular weight (fraction I). An additional 100 cc. of methyl alcohol is then added to about 2600 cc. of the remaining solution to secure a fraction II by repetition of the technique.

A fraction III, a heavy oil, may be secured by again adding another 100 cc. of methyl alcohol to 2600 cc. of the remaining original solution. A final fraction IV, comprising a heavy dark oil, results from evaporation of the remainder of the solution.

*Example B Adhesive*

A transparent adhesive was formulated on a rubber mill by thoroughly mixing the above secured fractions I and III in proportions of 35 parts by weight of fraction I to 30 parts by weight of fraction III.

As in the case of the polybutene adhesive, the adhesive may be spread in a gasoline-type solvent on any one of the previously mentioned backing materials and fillers of the type heretofore mentioned may be incorporated in the adhesive before spreading.

*Example C*

Polystyrene, a polymer of vinyl benzene, is a further example of an elasto-viscous material which may be prepared in fractions of widely separated molecular weight and combined to form useful pressure-sensitive adhesives.

I have discovered that a polystyrene adhesive may be prepared by partially polymerizing a quantity of monomeric styrene, and then dissolving the partially polymerized composition, which is at a predeterminedly controlled degree of polymerization, in a further quantity of styrene—either monomeric styrene or polymeric styrene at a lower degree of polymerization, or mixtures thereof—and which second quantity of styrene contains a styrene polymerization inhibitor or retarding agent. Such ingredients may be formulated so that the composition has suitable viscosity for spreading on a backing and so that further polymerization will be definitely controlled with the adhesive retaining sticky, tacky characteristics over substantial periods of time after spreading, by proper packaging, whereby, upon removal from the package, the coating will be fresh, soft and tacky, as is required for classification as a pressure-sensitive adhesive, and will remain so at room temperatures for a period sufficiently long to permit manipulation of the coated backing as a flexible pressure-sensitive adhesive tape with application in the customary manner to electrical or other parts, to which the tape will conform by reason of its flexibility.

The following is an example of a typical preparation:

Seventy-two parts of styrene monomer are polymerized at 125° C. for a period of approximately 3 hours, then cooled as rapidly as possible and mixed with 22½ parts of styrene monomer. Since styrene monomer is unstable, the above operations may be advantageously conducted in a nitrogen atmosphere. This composition has a viscosity suitable for doctor spreading on any suitable sheet backing, for instance, of glass, polystyrene or polybutene. In order however to maintain stability, it is advantageous to incorporate in the mix .05% of a styrene polymerization inhibitor in the form of hydroquinone, or equivalent amounts of quinone, benzoquinone or phenanthraquinone.

The composition as applied will have soft, sticky tacky characteristics and will be transparent. Where the coating is to be thin, the spreading operation is also advantageously conducted in the absence of oxygen. Application of the coating may be to one or both sides of the backing, or by an impregnating operation, the supporting medium, if of the porous type like woven glass fabric, can be provided with a pressure-sensitive tacky adhesive on both sides. Whether the operation be one of coating or of impregnating, a thin continuous flexible film of the composition may be secured. In some cases volatile hydrocarbon solvents may be resorted to as thinners or diluents for the purpose of spreading the compositions on the backing.

Again ground or pulverized solid polymeric styrene or any one of the several hard varieties of polystyrene, finely ground mica, ground silica (quartz), ground glass, or combinations thereof may be included as inert fillers.

Because of the unstable characteristics of styrene polymers, especially those of low molecular weight, packaging precautions are required, not found in the case of polybutene and other of the polymeric adhesives described in this application. In the case of polystyrene adhesive, it is sufficient for some conditions to package the tape in rolled form, with or without an interliner, in an air-tight, light-tight container. Under other conditions, it is advantageous to evacuate partially the container of air or to fill the container with a gas which will not catalyze styrene polymerization, examples of such gases being nitrogen and carbon dioxide. Where qualities permitting storage for maximum time periods are required, instead of using a gas which merely is inactive so far as the polymerization reaction is concerned, it may be found desirable to introduce a gas of a type which of itself tends to inhibit styrene polymerization. The gaseous hydrocarbons isobutane, butylene and propane are gases useful for this purpose.

The stability of the tape may also be controlled depending upon the particular type and amount of inhibitor included. In the usual case, the polymerization retarding effect of the inhibitor is overcome in the course of exposure to oxygen over a period of time with resulting gradual polymerization of the styrene adhesive into a dry mass. Such final setting up of the adhesive to form in some cases a bond between the backing and the article to which the tape has been applied, may if desired be accelerated by application of heat and/or by the inclusion in the adhesive mass of oxygen catalysts, preferably those becoming active at elevated temperature.

While I have given as specific examples of adhesives prepared in accordance with this invention those formed of polymeric systems having unnatural polymolecular distribution prepared from hydrocarbons containing as a monomeric unit one or more of the monomers butene, butadiene, and styrene, it is contemplated that similar adhesives, transparent or otherwise, may be formulated from elasto-viscous materials resulting from a deliberate perturbation of the normal polymolecular distribution of natural or synthetically prepared polymeric hydrocarbons or substituted hydrocarbons, containing as a monomeric unit isoprene or chloroprene. Polychloroprene systems are however not particularly suitable for electrical purposes because polychloroprene contains a polar molecular group in contrast to the non-polar molecular characteristics of polybutene, polystyrene and polybutadiene. Similar criticism is applicable to adhesives formed of Buna-N (Perbunan) which contains a polar nitrile group.

The particular properties of all the polymeric hydrocarbon adhesive masses of this invention, and especially their viscosity and tack properties, may be established through suitable control of certain variables. The first of these is the particular character of the unnatural distribution or degree of perturbation, depending upon the particular fractions used, which in turn depend, in the case of fractionation preparation, upon the particular precipitate secured or, in the case of incomplete polymerization preparation of the fraction from the monomer or from lower polymers, upon the degree of polymerization resulting from the particular temperature and duration and/or catalyst of polymerization. Where the monomer is a liquid, as in the case of styrene, isoprene and chloroprene, the monomer may be used as a unique but usable molecular weight species for varying the particular molecular weight distribution and thus the particular characteristics of the elasto-viscous material. The monomers butadiene and butene are gaseous. In general, as above illustrated, adhesives of general use are obtained by utilizing as a sole tack-inducing or plasticizing ingredient for a high molecular weight polymer, polymers of low molecular weight or weights, preferably having a viscosity like those above given, of the order of $10^1$–$10^3$ poises, as distinguished from solid tack-inducing plasticizers such as resins having at room temperature high viscosities of the order of $10^{18}$ poises, to produce elasto-viscous materials having at room temperature viscosities running from about $10^6$ poises down to $10^4$ poises; and such low molecular weight plasticizers, as above indicated, may be monomerically identical with the high polymer. A natural high polymer of natural unperturbed molecular weight distribution such as natural rubber has a viscosity at room temperature of $10^7$ running to perhaps $10^9$ poises.

Second, the viscosity and consistency of the mass may be controlled by properly proportioning the amount of individual fractions which are interadmixed in the formation of the adhesive.

The consistency may also be modified in the direction of greater viscosity by resorting to a vacuum distillation of one or more of the fractions utilized or of the final adhesive, thereby removing a portion of monomer which may remain in the fractions or the adhesive.

Other useful adhesives may be secured by combining fractions of polymers of one monomeric unit with compatible fractions of polymers of another different monomeric unit. Thus a high molecular weight polybutene may be admixed with a low molecular weight fraction of butadiene-styrene copolymer or of polyisoprene. Inversely, a high molecular weight fraction of the copolymer may be combined with a low molecular weight polybutene alone or with a low molecular weight fraction of copolymers or of polyisoprene or with isoprene or other liquid monomer. Further combinations of olefinic polymers will be readily recognized as possible formulations. Where styrene is used in an intermediate or incomplete stage of polymerization, it will be understood that inclusion of the inhibitor is essential for preservation of the adhesive in a stable condition.

The term "stable polymeric hydrocarbon elasto-viscous material" as used herein connotes a polymeric hydrocarbon elasto-viscous material which is stable against further polymerization either in and of itself or by reason of the presence of a polymerization retarding agent or inhibitor in minute quantities, for instance, of the order of .05% by weight of the hydrocarbon ingredient of the elasto-viscous material.

This application is a continuation-in-part of my earlier co-pending application, Serial No. 380,013, filed February 21, 1941, now abandoned:

I claim:

1. A pressure-sensitive adhesive tape comprising a flexible sheet backing bearing a coat of a normally tacky pressure-sensitive elasto-viscous composition having a viscosity of from $10^4$ to $10^6$ poises, the adhesive component of said composition consisting of a compatible mixture of a polymeric hydrocarbon of relatively high molecular weight having a viscosity greater than $10^7$ poises and of a polymeric hydrocarbon of relatively low molecular weight having a viscosity of from about $10^1$ to $10^3$ poises, said polymeric hydrocarbons being selected from the group consisting of polybutene, polyisoprene, butadiene-styrene copolymers and styrene polymers.

2. A pressure-sensitive adhesive tape as claimed in claim 1, wherein the pressure-sensitive composition has, as an additional ingredient, an inert filler.

3. A pressure-sensitive adhesive tape as claimed in claim 1, wherein the said high molecular weight and low molecular weight polymeric hydrocarbons are polymers of the same monomer.

4. A pressure-sensitive adhesive tape comprising a flexible sheet backing bearing a coat of a normally tacky pressure-sensitive elasto-viscous composition having a viscosity of from $10^4$ to $10^6$ poises, the adhesive component of said composition consisting of a mixture of polybutene of relatively high molecular weight having a viscosity above $10^7$ poises and of polybutene of relatively low molecular weight having a viscosity of from about $10^1$ to $10^3$ poises.

5. A pressure-sensitive adhesive tape as claimed in claim 1, wherein the flexible sheet backing is polystyrene.

WARNER EUSTIS.

REFERENCES CITED

The following references are of record in the file of this patent:

UNITED STATES PATENTS

| Number | Name | Date |
|---|---|---|
| 1,842,456 | MacKenzie | Jan. 26, 1932 |
| 2,042,333 | Coe | May 26, 1936 |
| 2,051,840 | Gerhart | Aug. 25, 1936 |
| 2,061,570 | Frolich | Nov. 24, 1936 |
| 2,103,841 | Calvert | Dec. 28, 1937 |
| 2,106,850 | McCulloch | Feb. 1, 1938 |
| 2,124,234 | Mueller-Cunradi et al. | July 19, 1938 |
| 2,145,350 | Haslam | Jan. 31, 1939 |
| 2,147,824 | Webb | Feb. 21, 1939 |
| 2,238,694 | Graver | Apr. 15, 1941 |
| 2,256,160 | Britton et al. | Sept. 16, 1941 |
| 2,285,570 | Cummins et al. | June 9, 1942 |
| 2,319,959 | Tierney | May 25, 1943 |
| 2,365,646 | New et al. | Dec. 19, 1944 |
| 2,395,419 | Mitchell | Feb. 26, 1946 |
| 2,415,276 | Buckley et al. | Feb. 4, 1947 |
| 2,421,640 | New et al. | June 3, 1947 |
| 2,439,481 | Martin | Apr. 13, 1948 |

FOREIGN PATENTS

| Number | Country | Date |
|---|---|---|
| 401,500 | Great Britain | Nov. 16, 1933 |
| 553,766 | Great Britain | 1943 |